US012762986B2

(12) United States Patent
Lee

(10) Patent No.: US 12,762,986 B2
(45) Date of Patent: Oct. 13, 2026

(54) DISPLAY DEVICE AND METHOD FOR DRIVING PIXELS BY PROCESSING IMAGE DATA

(71) Applicant: SAMSUNG DISPLAY CO., LTD., Yongin-si (KR)

(72) Inventor: Kyung Hun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 185 days.

(21) Appl. No.: 18/229,084

(22) Filed: Aug. 1, 2023

(65) Prior Publication Data

US 2024/0046842 A1 Feb. 8, 2024

(30) Foreign Application Priority Data

Aug. 2, 2022 (KR) ........................ 10-2022-0096399

(51) Int. Cl.
*G09G 3/20* (2006.01)

(52) U.S. Cl.
CPC .................................. *G09G 3/2044* (2013.01)

(58) Field of Classification Search
CPC ...... G09G 3/2044; G09G 3/32; G09G 3/3225; G09G 3/3275; G09G 2310/08; G09G 2340/0435; G09G 2340/16
USPC .......................................................... 345/596
See application file for complete search history.

(56) References Cited

U.S. PATENT DOCUMENTS

| | | | | | |
|---|---|---|---|---|---|
| 7,808,510 | B2 * | 10/2010 | Miyasaka | H04N 19/86 | 345/596 |
| 8,179,401 | B2 * | 5/2012 | Ishii | H04N 9/3111 | 345/589 |
| 9,870,732 | B2 | 1/2018 | Park et al. | | |
| 10,255,839 | B2 | 4/2019 | Lee et al. | | |
| 10,839,755 | B2 | 11/2020 | Ha et al. | | |
| 11,011,123 | B1 * | 5/2021 | Hunt | G09G 3/3618 | |
| 11,030,971 | B2 | 6/2021 | Lee | | |
| 11,176,901 | B1 * | 11/2021 | Hunt | G09G 3/32 | |
| 2004/0051717 | A1 * | 3/2004 | Naiki | G09G 3/2051 | 345/596 |
| 2005/0030264 | A1 * | 2/2005 | Tsuge | G09G 3/3283 | 345/76 |
| 2008/0224976 | A1 * | 9/2008 | Lee | G09G 3/2055 | 345/89 |
| 2009/0128586 | A1 * | 5/2009 | Ahn | G09G 3/3648 | 345/690 |

(Continued)

FOREIGN PATENT DOCUMENTS

| | | |
|---|---|---|
| KR | 20160049942 A | 5/2016 |
| KR | 1020160072344 | 6/2016 |

(Continued)

*Primary Examiner* — Sheree N Brown
(74) *Attorney, Agent, or Firm* — CANTOR COLBURN LLP

(57) ABSTRACT

A display device includes a display panel including a plurality of pixels, a data driver connected to the plurality of pixels through data lines, where the data driver controls the plurality of pixels by driving the data lines, and a controller which controls a driving of the data driver by processing image data input thereto at a variable refresh rate. The controller controls the driving of the data driver by selectively performing dithering on input image data, which is input thereto, based on a frame frequency corresponding to the input image data.

9 Claims, 21 Drawing Sheets

(56) References Cited

U.S. PATENT DOCUMENTS

| | | | | |
|---|---|---|---|---|
| 2009/0244108 | A1* | 10/2009 | Park | G09G 3/204 345/690 |
| 2010/0238193 | A1* | 9/2010 | Neal | G09G 5/36 345/98 |
| 2012/0236021 | A1* | 9/2012 | Parmar | G09G 3/3466 345/596 |
| 2016/0293132 | A1* | 10/2016 | Zhang | G09G 3/20 |
| 2017/0140689 | A1* | 5/2017 | Kobori | H04N 9/3161 |
| 2017/0243550 | A1* | 8/2017 | Shepelev | G09G 3/3611 |
| 2018/0059868 | A1* | 3/2018 | Brahma | G09G 3/2022 |
| 2019/0180695 | A1* | 6/2019 | Ha | G09G 3/2051 |
| 2020/0107032 | A1 | 4/2020 | Ivanovic et al. | |
| 2020/0202816 | A1 | 6/2020 | Kim et al. | |
| 2021/0056885 | A1* | 2/2021 | Park | G09G 3/3291 |

FOREIGN PATENT DOCUMENTS

| | | | |
|---|---|---|---|
| KR | 101985244 | | 6/2019 |
| KR | 1020190069667 | A | 6/2019 |
| KR | 20200077669 | A | 7/2020 |

* cited by examiner

DISPLAY DEVICE AND METHOD FOR DRIVING PIXELS BY PROCESSING IMAGE DATA

This application claims priority to Korean Patent Application No. 10-2022-0096399, filed on Aug. 2, 2022, and all the benefits accruing therefrom under 35 U.S.C. § 119, the content of which in its entirety is herein incorporated by reference.

BACKGROUND

1. Field

The disclosure relates to an electronic device, and more particularly, to a display device and a method for driving pixels by processing image data.

2. Description of the Related Art

As information technology is developed, importance of a display device, which is a connection medium between a user and information, has been highlighted. Accordingly, a display device such as a liquid crystal display device and an organic light emitting display device are widely used in various fields.

SUMMARY

Recently, a method of driving a display device while changing a period of one frame is being used for accurate image processing. Therefore, a method capable of improving display quality when a frame period of an image displayed on a display device is changed may be desired.

Embodiments of the disclosure to provide a device and a method capable of displaying an image with improved reliability. In such embodiment, the display device may drive a display panel by selectively performing dithering based on a frame frequency of input image data, such that a luminance change of a display image may be suppressed even though the frame frequency is rapidly changed.

According to an embodiment of the disclosure, a display device includes a display panel including a plurality of pixels, a data driver connected to the plurality of pixels through data lines, where the data driver controls the plurality of pixels by driving the data lines, and a controller which controls a driving of the data driver by processing image data input thereto at a variable refresh rate. In such an embodiment, the controller controls the driving of the data driver by selectively performing dithering on input image data, which is input thereto, based on a frame frequency corresponding to the input image data.

In an embodiment, the controller may trigger performance of the dithering based on a change value of the frame frequency.

In an embodiment, the input image data may include a first image frame and a second image frame, which are sequentially input, the first image frame may correspond to a first frame frequency, the second image frame may correspond to a second frame frequency, and the controller may trigger performance of the dithering based on a difference value between the first and second frame frequencies.

In an embodiment, the second frame frequency may be lower than the first frame frequency, and the controller may trigger the performance of the dithering when the difference value between the first and second frame frequencies is greater than a threshold value.

In an embodiment, the input image data may further include a third image frame input after the second image frame, the third image frame may correspond to a third frame frequency higher than the second frame frequency, and the controller may deactivate the performance of the dithering when the third frame frequency is higher than a predetermined reference frequency.

In an embodiment, the frame frequency may change between a first frequency and a second frequency higher than the first frequency, the controller may control the driving of the data driver by selectively performing the dithering based on a change value of the frame frequency when the frame frequency is higher than a third frequency and lower than the second frequency, and the third frequency may be in a range between the first and second frequencies.

In an embodiment, the controller may include a dithering circuit which performs the dithering on the input image data, and a signal selector which outputs one of the dithered image data and the input image data, and the one of dithered image data and the input image data may be provided to the data driver.

In an embodiment, the controller may further include a dithering controller which activates or deactivates the dithering circuit based on a change value of the frame frequency.

In an embodiment, the controller may include a frequency sensor which generates a signal indicating the frame frequency based on at least one of the input image data and a control signal associated with the input image data and provides the signal to the dithering controller.

In an embodiment, the dithering controller may be configured to generate a selection signal which is enabled when the dithering circuit is activated and disabled when the dithering circuit is deactivated, and the signal selector may select and output one of the dithered image data and the input image data in response to the selection signal.

In an embodiment, the controller may include a timing controller which receives the input image data from an external graphic processor.

According to another embodiment of the disclosure, a method of driving a display device by processing image data input thereto at a variable refresh rate includes monitoring a frame frequency corresponding to input image data, which is input to the display device, selectively activating dithering on the input image data based on the frame frequency, driving a display panel of the display device based on dithered input image data when the dithering is activated, and driving the display panel based on the input image data when the dithering is deactivated.

In an embodiment, the selectively activating the dithering may include selectively activating the dithering based on a change value of the frame frequency.

In an embodiment, the input image data may include a first image frame and a second image frame, which are sequentially input, the first image frame may correspond to a first frame frequency, the second image frame may correspond to a second frame frequency, and selectively activating the dithering may include activating the dithering based on a difference value between the first and second frame frequencies.

In an embodiment, the second frame frequency may be lower than the first frame frequency, and the dithering may be activated when the difference value between the first and second frame frequencies is greater than a threshold value.

In an embodiment, the input image data may further include a third image frame input after reception of the second image frame, the third image frame may correspond to a third frame frequency higher than the second frame frequency, and the method may further include deactivating the dithering when the third frame frequency is higher than a predetermined reference frequency.

According to still another embodiment of the disclosure, a display device includes a display panel, a data driver connected to the display panel through data lines, where the data driver controls the display panel by driving the data lines, and a controller which controls a driving of the data driver by processing image data input from an outside. In such an embodiment, the controller generates a histogram for grayscales of data pixels of input image data, which is input thereto, detects an edge rate of the input image data based on data pixels corresponding to an edge among the data pixels of the input image data, and controls the driving of the data driver based on the dithered image data or the input image data by selectively activating dithering on the input image data based on at least one selected from the histogram and the edge rate.

In an embodiment, the controller may deactivate the dithering when a number of data pixels belonging to a determined grayscale range of the histogram, among the data pixels of the input image data, is higher than a first reference value.

In an embodiment, the controller may deactivate the dithering when the edge rate is higher than a second reference value.

In an embodiment, the controller may activate the dithering when the number of data pixels belonging to a determined grayscale range of the histogram, among the data pixels of the input image data, is less than or equal to a first reference value and the edge rate is less than or equal to a second reference value.

According to embodiments of the disclosure, a display device capable of displaying an image with improved reliability is provided.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
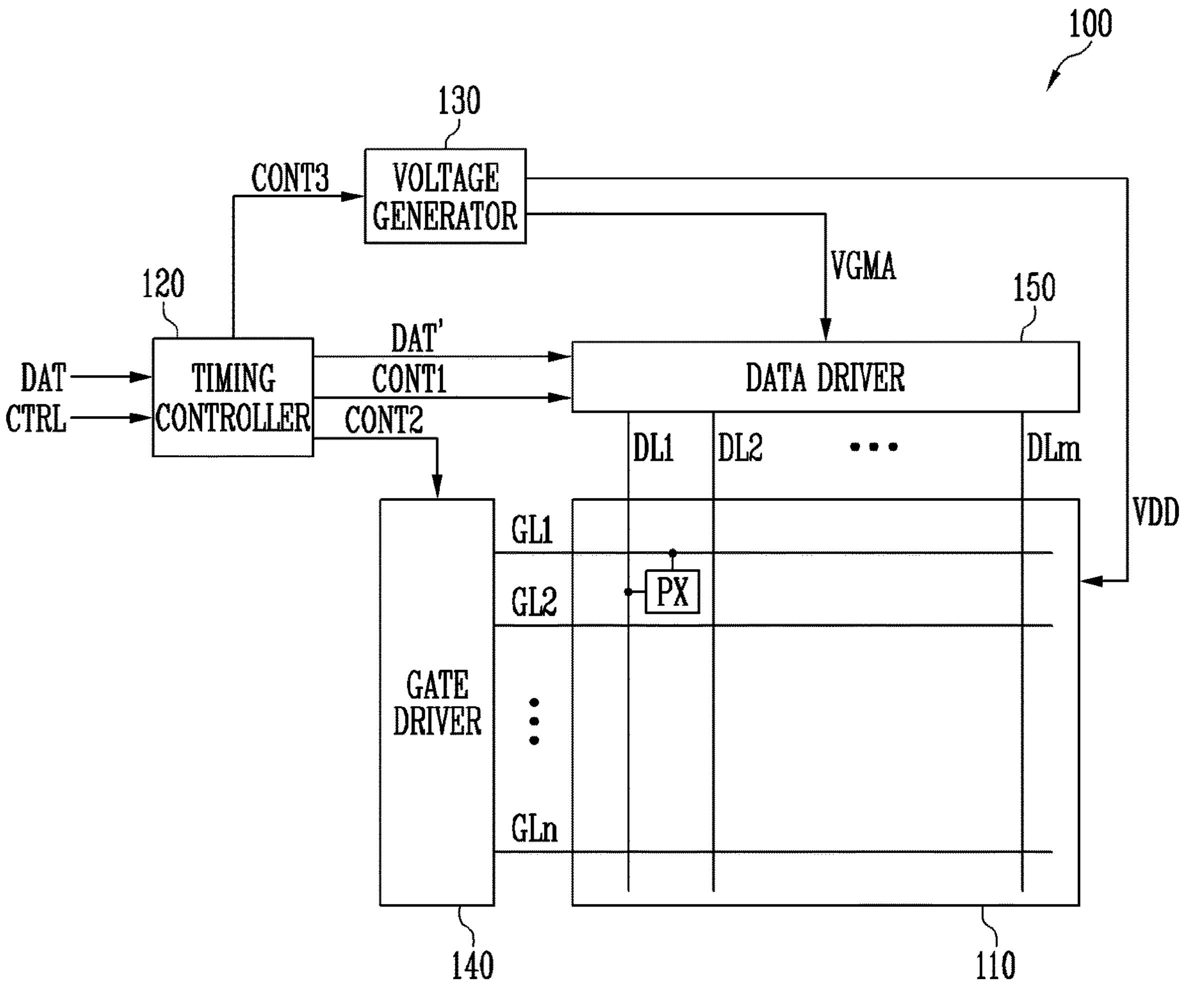
FIG. 1 is a block diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Terms of “first”, “second”, and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

In the following description, a case where a portion is connected to another portion includes a case where they are electrically connected to each other with another element interposed therebetween as well as a case in which they are directly connected to each other. In an embodiment of the disclosure, a term "connection" between two configurations may mean that both of an electrical connection and a physical connection are inclusively used.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display device according to an embodiment of the disclosure.

Referring to FIG. 1, an embodiment of the display device 100 includes a display panel 110, a timing controller 120, a voltage generator 130, a gate driver 140, and a data driver 150.

The display panel 110 includes pixels PX. The pixels PX are connected to the gate driver 140 through first to n-th gate lines GL1 to GLn, and connected to the data driver 150 through first to m-th data lines DL1 to DLm. Here, n and m are integers greater than 1.

Each of the pixels PX may include a light emitting element and transistors for driving the light emitting element. In embodiments, the light emitting element may include an organic light emitting element and/or an inorganic light emitting element.

The timing controller 120 controls an overall operation of the display device 100. The timing controller 120 receives first image data DAT and control signals CTRL for controlling display thereof, for example, a vertical synchronization signal, a horizontal synchronization signal, a main clock signal, a data enable signal, and the like. The timing controller 120 adjusts a timing of the first image data DAT based on the control signals CTRL and provides second image data DAT' to the data driver 150. In embodiments, the second image data DAT' may be linearized in a way such that a gamma characteristic of the second image data DAT' is proportional to a luminance and may be provided to the data driver 150.

The timing controller 120 may transmit a first control signal CONT1 to the data driver 150, transmit a second control signal CONT2 to the gate driver 140, and transmit a third control signal CONT3 to the voltage generator 130, based on the control signals CTRL. In embodiments, the first control signal CONT1 may include a clock signal and a line latch signal, and the second control signal CONT2 may include a vertical synchronization start signal, an output enable signal, and the like.

The voltage generator 130 generates a plurality of voltages and clock signals used for an operation of the display panel 110. The voltage generator 130 may operate in response to the third control signal CONT3 from the timing controller 120. In embodiments, the voltage generator 130 may adjust a level of a first driving voltage VGMA and a second driving voltage VDD in response to the third control signal CONT3, provide the first driving voltage VGMA to the data driver 150, and provide the second driving voltage VDD to the pixels PX of the display panel 110.

The gate driver 140 drives each of the first to n-th gate lines GL1 to GLn in response to the second control signal CONT2 from the timing controller 120. In embodiments, the gate driver 140 includes a gate driving integrated circuit (IC). In embodiments, the gate driver 140 may be implemented as a circuit using an amorphous silicon gate (ASG) using an amorphous silicon switching transistor (amorphous silicon thin film transistor a-Si TFT), an oxide semiconductor, a crystalline semiconductor, a polycrystalline semiconductor, or the like. The gate driver 140 may be formed simultaneously with the pixels PX in a same process.

The data driver 150 may drive the first to m-th data lines DL1 to DLm in response to the first control signal CONT1. The data driver 150 may output grayscale voltages corresponding to the second image data DAT' to the first to m-th data lines DL1 to DLm using the first driving voltage VGMA in response to the first control signal CONT1.

When each of the gate lines GL1 to GLn is driven with a gate-on voltage by the gate driver 140, the grayscale voltages corresponding to the second image data DAT' may be applied to the data lines DL1 to DLm by the data driver 150. Accordingly, the grayscale voltages corresponding to the second image data DAT' may be provided to the pixels PX connected to a corresponding gate line, and the pixels PX may output light of a luminance corresponding to the grayscale voltages. Accordingly, an image is displayed on the display panel 110.

A variable time may be used for a graphic processor connected to the display device 100 to render image data such as a high-definition game image and a virtual reality image. As described above, the graphic processing processor may transmit the first image data DAT having a variable refresh rate to the display device 100. In other words, a frequency (hereinafter, a frame frequency) of each of image frames included in the first image data DAT may vary. The timing controller 120 may display the first image data DAT while changing the driving frequency of the display device 100 based on the frame frequency of the received first image data DAT.

Figure 2:
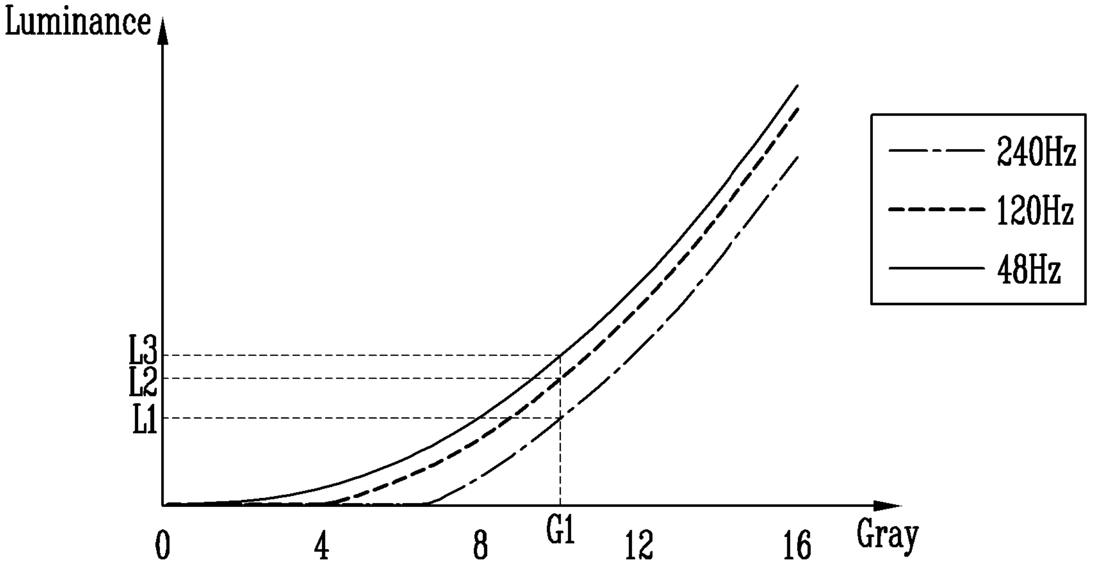
FIG. 2 is graphs illustrating a luminance displayed versus a grayscale when image data of different frame frequencies is displayed.

FIG. 2 is graphs illustrating a luminance displayed versus a grayscale when image data of different frame frequencies is displayed. In FIG. 2, a horizontal axis represents a grayscale Gray, and a vertical axis represents a luminance Luminance implemented by the display device. In FIG. 2, a luminance corresponding to a relatively low grayscale range is shown as a graph. For example, a grayscale of each data pixel of the image data may have a value greater than or equal to 0 and less than or equal to 255, and among them, graphs corresponding to grayscale values greater than or equal to 0 and less than or equal to 16 are shown.

Referring to FIG. 2, each of 240 Hz of image data, 120 Hz of image data, and 48 Hz of image data is displayed with a luminance increased as the grayscale value increases.

The same grayscale value may be displayed with different luminance based on the frame frequency of the image data. In FIG. 2, a first grayscale value G1 of the 240 Hz of image data may be displayed as a first luminance level L1, a first grayscale value G1 of the 120 Hz of image data may be displayed as a second luminance level L2 higher than the first luminance level L1, and a first grayscale value G1 of the 48 Hz of image data may be displayed as a third luminance level L3 higher than the second luminance level L2. In a case, for example, when image data of a low frame frequency is received, a driving frequency of the display device may be decreased, and thus the image data may be displayed during a relatively long time. In this case, a luminance of a display image may increase. In a case, for example, a period in which a node in a circuit included in the pixel (refer to PX of FIG. 1) is initialized at a low driving frequency may be longer than a period in which the corresponding node is initialized at a high driving frequency. In this case, the luminance of the display image may increase.

In addition, due to various factors, the image data of a same grayscale with the relatively low frame frequency may be displayed with a relatively high luminance. Accordingly, when the frame frequency of the image data is rapidly lowered, a relatively large luminance deviation between image frames may occur, and such a luminance deviation may be recognized by a user. In particular, since a low grayscale is displayed with a relatively low luminance, a display luminance corresponding to the low grayscale may be significantly affected by a luminance deviation between image frames of different frame frequencies.

For example, the user may recognize a luminance deviation when the frame frequency of the image data is rapidly lowered, particularly in a low grayscale area.

Figure 3:
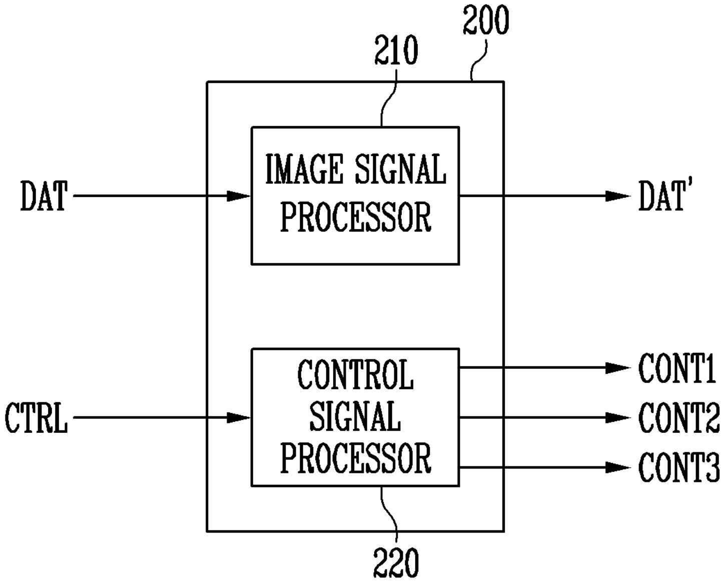
FIG. 3 is a block diagram illustrating an embodiment of a timing controller of FIG. 1.

FIG. 3 is a block diagram illustrating an embodiment of the timing controller of FIG. 1.

Referring to FIG. 3, an embodiment of the timing controller 200 may include an image signal processor 210 and a control signal processor 220.

The image signal processor 210 may process the first image data DAT to generate second image data DAT', and transmit the generated second image data DAT' to the data driver 150. According to an embodiment of the disclosure, the image signal processor 210 may selectively perform dithering (or a digital-in-analog (DIA) operation) on the first image data DAT based on a frame frequency corresponding to the first image data DAT. In an embodiment, as described above, the image signal processor 210 may provide dithered image data as the second image data DAT' or provide the first image data DAT as the second image data DAT' without performing dithering.

The control signal processor 220 may output the first control signal CONT1, the second control signal CONT2, and the third control signal CONT3 based on the control signals CTRL. As described with reference to FIG. 1, the first control signal CONT1, the second control signal CONT2, and the third control signal CONT3 may be provided to the data driver 150, the gate driver 140, and the voltage generator 130, respectively.

Figure 4:
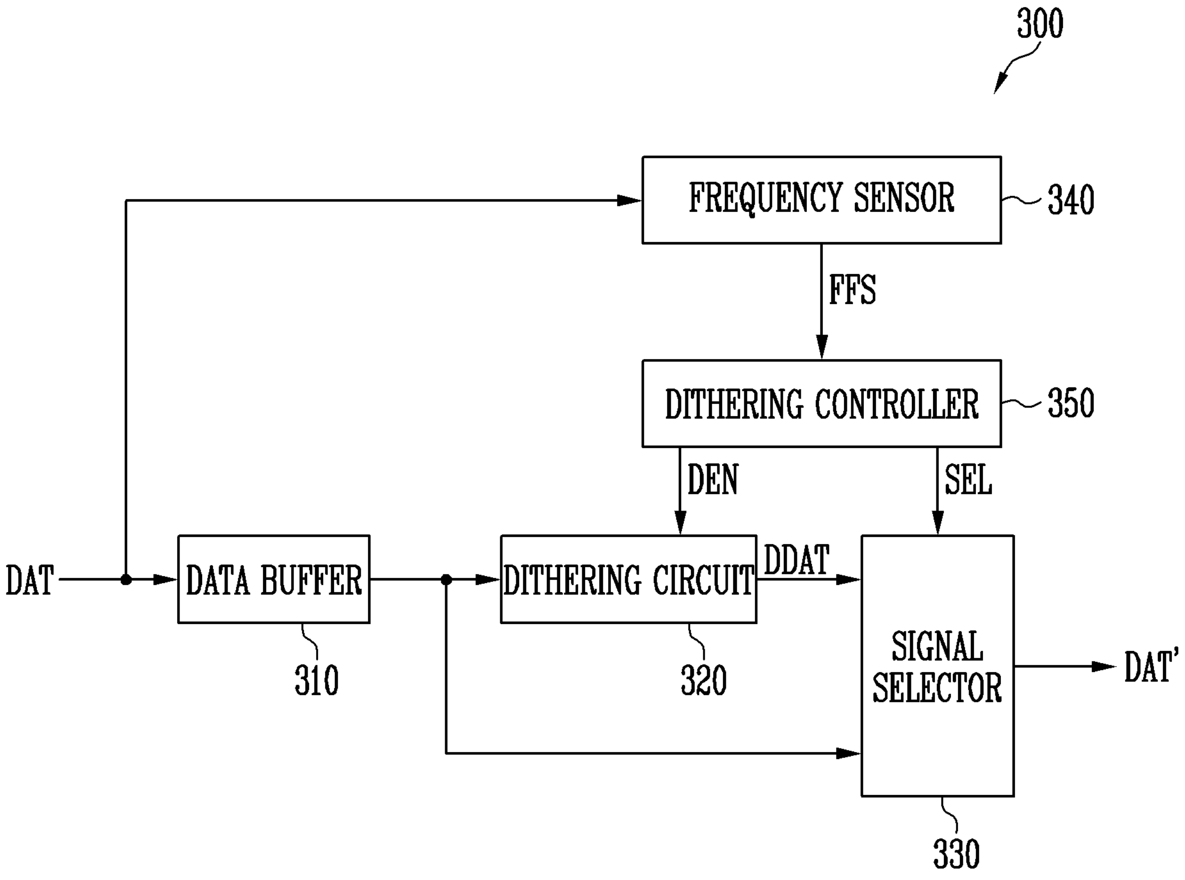
FIG. 4 is a block diagram illustrating an embodiment of an image signal processor of FIG. 3.
Figure 5:
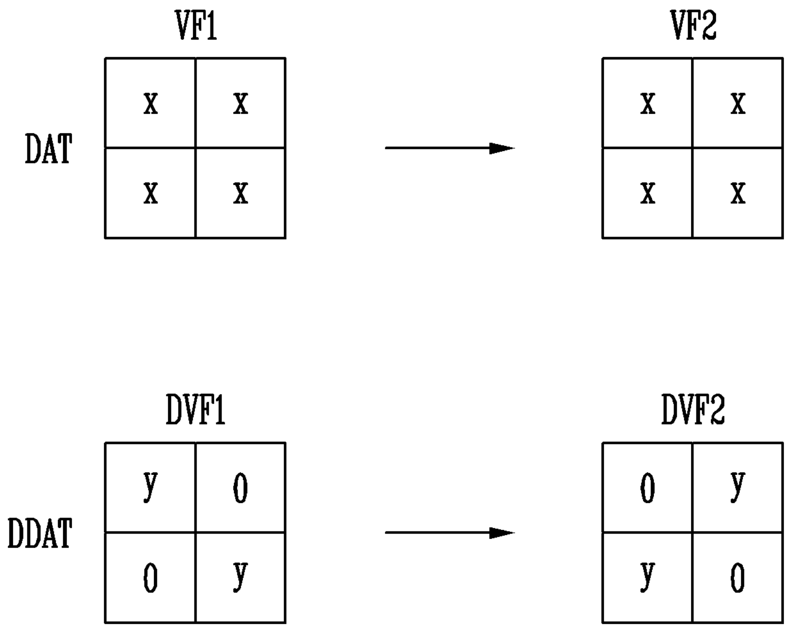
FIG. 5 is a diagram illustrating image frames dithered by a dithering circuit of FIG. 4.
Figure 6:
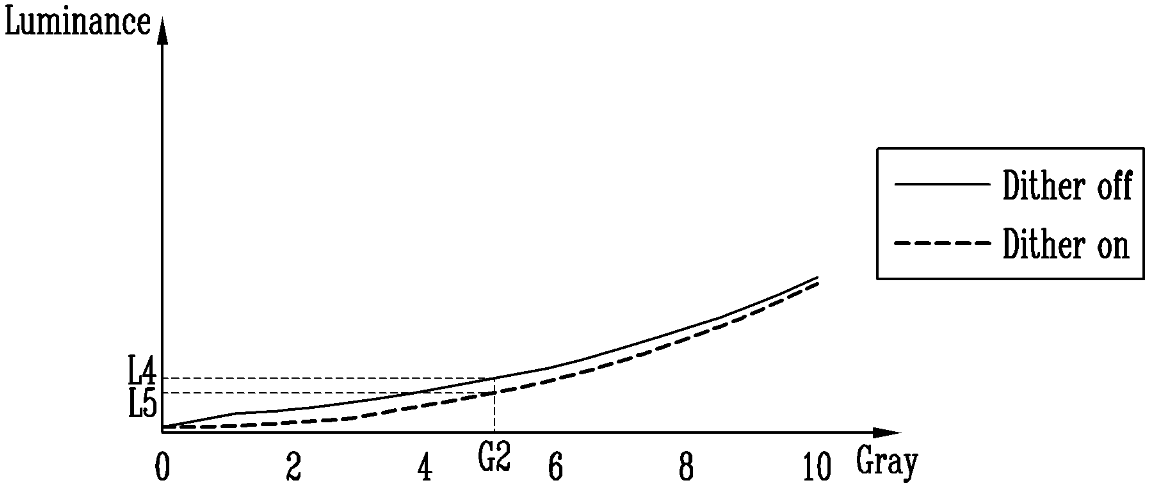
FIG. 6 is a graph illustrating a display luminance according to a grayscale when first image data and dithered image data are displayed.
Figure 7:
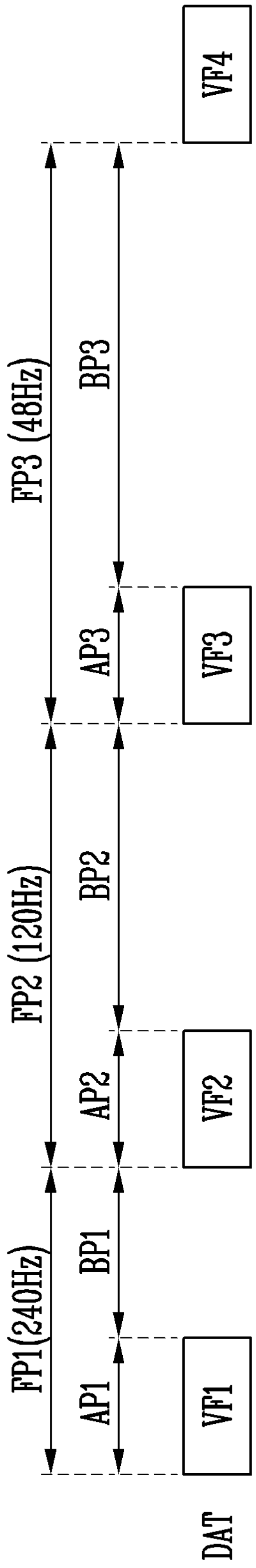
FIG. 7 is a timing diagram illustrating an embodiment of image data of FIG. 1.

FIG. 4 is a block diagram illustrating an embodiment of the image signal processor of FIG. 3. FIG. 5 is a diagram illustrating image frames dithered by a dithering circuit of FIG. 4. FIG. 6 is a graph illustrating a display luminance according to a grayscale when the first image data and the dithered image data are displayed. FIG. 7 is a timing diagram illustrating an embodiment of the image data of FIG. 1.

First, referring to FIG. 4, an embodiment of the image signal processor 300 may include a data buffer 310, a dithering circuit 320, a signal selector 330, a frequency sensor 340, and a dithering controller 350.

The data buffer 310, for example, a memory, may temporarily store the first image data DAT and provide the stored first image data DAT to the dithering circuit 320. In embodiments, the data buffer 310 may receive a current image frame of the first image data DAT and output a previous image frame of the first image data DAT. In an embodiment, for example, the data buffer 310 may delay output of the image frame during one or more frame periods to provide the corresponding image frame to the dithering circuit 320 after determining whether to perform dithering by the dithering controller 350.

The dithering circuit 320 may operate in response to control of the dithering controller 350. The dithering circuit 320 may receive a dithering enable signal DEN from the dithering controller 350 and may be activated and deactivated, respectively, when the dithering enable signal DEN is enabled and disabled.

The dithering circuit 320 outputs dithered image data DDAT by performing dithering on the first image data DAT read from the data buffer 310. The dithering circuit 320 may perform dithering on at least a portion of the first image data DAT based on at least one of dither algorithms known in the art. In embodiments, the dithering circuit 320 may set an area of data pixels having relatively low grayscales among the first image data DAT as a target area (for example, the low grayscale area), and convert grayscales of the data pixels of the target area into a dither pattern. The dither pattern may be for displaying one of grayscale 0 (or grayscale corresponding to black) and a selected dither grayscale in each data pixel. In such an embodiment, a memory for storing a lookup table for dithering may be provided, and a dither grayscale corresponding to the grayscale of the data pixel of the first image data DAT may be selected from the lookup table.

Referring to FIG. 5, dithering is performed on a target area of 2×2 data pixels in a first image frame VF1 of the first image data DAT. In an embodiment, as shown in FIG. 5, y may be selected as a dither grayscale corresponding to a grayscale x, and data pixels of grayscale 0 and grayscale y may be arranged based on the dither pattern, and corresponding data pixels of dithered first image frame DVF1 may be generated. The grayscale y may be higher than the grayscale x. y/2, which is an average grayscale of the generated data pixels, may be less than or equal to x, which is an average grayscale of the target area of the first image frame VF1. As described above, the dithered image frame may have an average grayscale equal to or lower than that of original image frame in the target area.

The dithering may be performed on a corresponding target area in a second image frame VF2 of the first image data DAT. The data pixels of grayscale 0 and grayscale y may be arranged based on a dither pattern different from the dither pattern applied to the first image frame VF1, and corresponding data pixels of the dithered second image frame DVF2 may be generated. y/2, which is the average grayscale of the generated data pixels, may be less than or equal to x.

In addition, the image data DDAT dithered through one of other various methods may be displayed (or recognized) with a luminance lower than that of the first image data DAT in the target area. In embodiments, when the dithered image data DDAT is generated, the control signal processor 220 of FIG. 3 may decrease an image luminance displayed by the display panel 110 (refer to FIG. 1) by adjusting levels of the first driving voltage VGMA (refer to FIG. 1) and/or the second driving voltage VDD (refer to FIG. 1). In an embodiment, for example, as shown in FIG. 6, the first image data DAT which is not dithered may be displayed as a fourth luminance L4 at a second grayscale value G2, and the dithered image data DDAT may be displayed as a fifth luminance L5 lower than the fourth luminance L4 at the second grayscale value G2.

Referring back to FIG. 4, the signal selector 330 is connected to the dithering circuit 320 and the data buffer 310. The signal selector 330 may receive a selection signal SEL from the dithering controller 350, select one of the dithered image data DDAT from the dithering circuit 320 and the first image data DAT in response to the selection signal SEL, and output the selected data as the second image data DAT'. The second image data DAT' may be provided to the data driver 150 of FIG. 1.

The frequency sensor 340 may sense the frame frequency corresponding to the first image data DAT and provide a frame frequency signal FFS indicating the sensed frame frequency to the dithering controller 350. In embodiments, the frequency sensor 340 may be connected to an input terminal of the data buffer 310 to receive the first image data DAT. In other embodiments, the frequency sensor 340 may be connected to an output terminal of the data buffer 310 to receive the first image data DAT.

Referring to FIG. 7, the first image data DAT may include image frames VF1 to VF4 of a variable refresh rate. In a first frame period FP1, a first image frame VF1 is received during a first active period AP1 and an image frame is not received during a first blank period BP1. In a second frame period FP2, a second image frame VF2 is received during a second active period AP2, and a second blank period BP2 continues until a next third image frame VF3 is received. The second active period AP2 has a same time duration as the first active period AP1, while the second blank period BP2 has a time duration longer than that of the first blank period BP1. In a third frame period FP3, the third image frame VF3 is received during a third active period AP3 and a third blank period BP3 continues until a next fourth image frame VF4 is received. The third active period AP3 has a same time duration as the second active period AP2, while the third blank period BP3 has a time duration longer than that of the second blank period BP2. As described above, each of the first to third frame periods FP1 to FP3 has an active period of the same time duration and has a blank period of a varying time duration, and thus lengths of the first to third frame periods FP1 to FP3 may be different from each other. For example, the first to third frame periods FP1 to FP3 may be 240 Hz, 120 Hz, and 48 Hz, respectively. In embodiments, the frequency sensor 340 (refer to FIG. 4) may determine frame frequencies of the image frames by sensing the blank periods BP1 to BP3 of the first image data DAT. In addition, the frame frequencies of the image frames may be determined based on other various methods, and embodiments thereof are further described with reference to FIGS. 9 and 10.

Referring back to FIG. 4, the dithering controller 350 receives the frame frequency signal FFS. The dithering controller 350 may control the dithering circuit 320 and the signal selector 330 in response to the frame frequency signal FFS.

As described with reference to FIG. 2, when the frame frequency of the first image data DAT rapidly changes, a luminance of an image displayed by the display panel 110 may change to a level recognized by the user. For example, when the frame frequency of the first image data DAT rapidly decreases, the luminance of the displayed image may increase to a level recognized by the user. In particular, a luminance of the low grayscale area among the image data DAT may be relatively significantly affected by such a luminance deviation.

According to an embodiment of the disclosure, the dithering controller 350 may control the dithering circuit 320 to trigger the performance of the dithering based on a change of the frame frequency, and control the signal selector 330 to output the dithered image data DDAT as the second image data DAT'. As described above, the dithering controller 350 may enable or disable the dithering enable signal DEN and the selection signal SEL based on the change of the frame frequency.

In an embodiment, as described above, the dithered image data DDAT may be displayed with a luminance lower than that of the first image data DAT in the low grayscale area. Even though the frame frequency of the first image data DAT rapidly decreases, the luminance deviation (or increase) of the display image may be suppressed compared to a case in which the first image data DAT is displayed as it is, by displaying the dithered image data DDAT. Accordingly, the user may not recognize the luminance deviation in the display image even though the frame frequency rapidly decreases. Therefore, the display device 100 (refer to FIG. 1) may display an image with improved reliability.

Figure 8A:
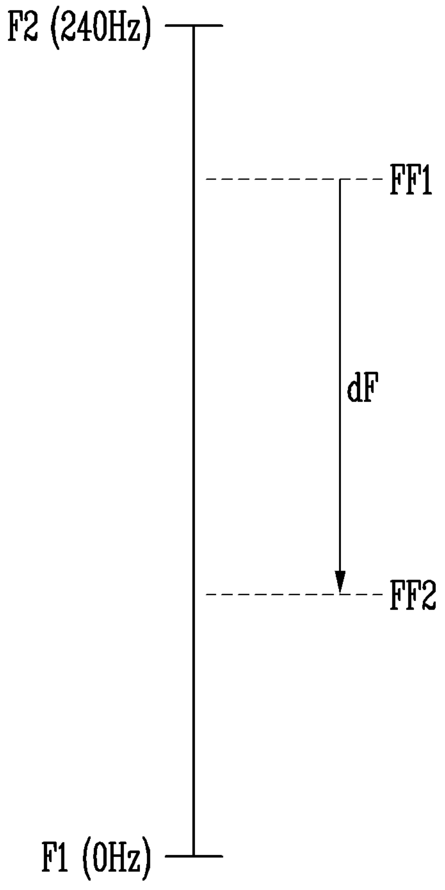
FIG. 8A is a diagram illustrating an embodiment of activating and deactivating dithering based on a change of a frame frequency of the image data.

FIG. 8A is a diagram illustrating an embodiment of activating and deactivating the dithering based on the change of the frame frequency of the image data.

Referring to FIGS. 4 and 8A, the frame frequency of the first image data DAT may vary between a first frequency F1 and a second frequency F2. The second frequency F2 may be higher than the first frequency F1. In an embodiment, for example, the first frequency F1 may be 0 Hz or 1 Hz, and the second frequency F2 may be 240 Hz.

The dithering may be selectively performed based on a change value of the frame frequency of the first image data DAT. The first image data DAT may include first and second image frames, which are sequentially received. In a stream of the first image data DAT, the first image frame may be an image frame which is p-th received, and the second image frame may be an image frame which is (p+q)-th received. Here, p is an integer greater than 0, and q is an integer greater than or equal to 1 and less than a predetermined value. The first and second image frames have first and second frame frequencies FF1 and FF2, respectively, and the second frame frequency FF2 is lower than the first frame frequency FF1. In this case, the dithering controller 350 may trigger the performance of the dithering when a difference value dF between the second frame frequency FF2 and the first frame frequency FF1 is greater than a predetermined threshold value, that is, when the frame frequency rapidly decreases. The dithering controller 350 may activate the dithering circuit 320 and control the signal selector 330 to output the dithered image data DDAT as the second image data DAT'. The above-described predetermined threshold value may be experimentally determined according to embodiments. In embodiments, the predetermined threshold value may be half of the second frequency F2. In an embodiment, for example, the predetermined threshold may be 120 Hz.

Thereafter, the dithering controller 350 may deactivate the dithering circuit 320 again. When the dithering circuit 320 is deactivated, the dithering controller 350 may control the signal selector 330 to output the first image data DAT as the second image data DAT'.

The dithering circuit 320 may be deactivated again under various conditions. In embodiments, when the frame frequency of the first image data DAT increases and is higher than a predetermined reference frequency, the dithering circuit 320 may be deactivated. The reference frequency may be experimentally selected according to embodiments.

For example, the predetermined reference frequency may be a frequency obtained by adding half of the second frequency F2 to the first frequency F1. As another example, the predetermined reference frequency may be a frequency obtained by adding half of the second frequency F2 to a third frequency F3 of FIG. 8B. In an embodiment, for example, the predetermined reference frequency may be in a range of 120 Hz or 180 Hz.

Figure 8B:
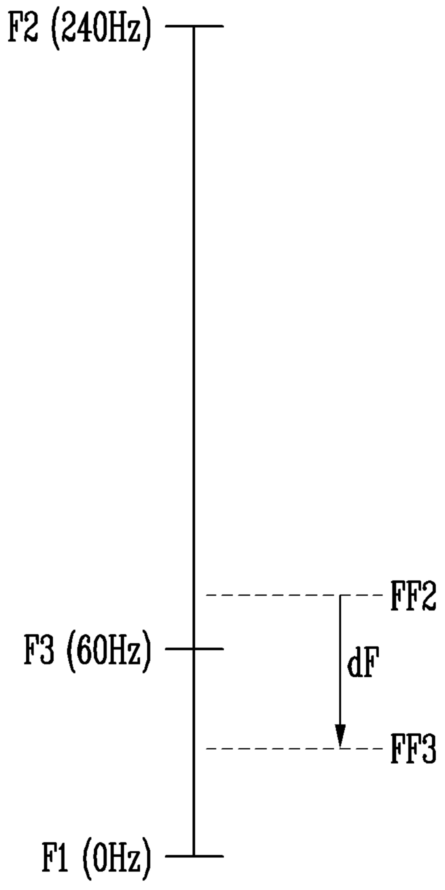
FIG. 8B is a diagram illustrating another embodiment of activating and deactivating the dithering based on the change of the frame frequency of the image data.

FIG. 8B is a diagram illustrating another embodiment of activating and deactivating the dithering based on the change of the frame frequency of the image data.

Referring to FIGS. 4 and 8B, in the stream of the first image data DAT, after the second image frame of the second frame frequency FF2 is received, a third image frame may be input. At this time, the third image frame may be an image frame which is r-th received after the second image frame (r is an integer greater than 1 and less than a predetermined value), and may correspond to a third frame frequency FF3 lower than the second frame frequency FF2.

When the dithering is in an activated state, the third frame frequency FF3 of the third image frame may be lower than the predetermined third frequency F3 as shown. The third frequency F3 may be experimentally selected according to embodiments. In embodiments, the third frequency F3 may be 60 Hz.

When the frame frequency is relatively low, if the dithered image data DDAT is displayed by the display device 100 (refer to FIG. 1), the user may recognize the dither pattern (refer to FIG. 5) or recognize flicker from the display image due to the relatively low driving frequency. The dithering controller 350 may deactivate the dithering circuit 320 again when the third frame frequency FF3 is lower than the predetermined third frequency F3. Accordingly, the dither pattern and/or flicker may be effectively prevented from being recognized by the user due to a relatively low driving frequency.

In embodiments, when the frame frequency of the first image data DAT is higher than the third frequency F3 and lower than or equal to the second frequency F2, as described with reference to FIG. 8A, the dithering circuit 320 may be selectively activated based on the change value of the frame frequency of the first image data DAT. In such an embodiment, when the frame frequency of the first image data DAT is lower than or equal to the third frequency F3 and higher than the first frequency F1, the dithering circuit 320 may be deactivated regardless of the change value of the frame frequency of the first image data DAT.

In embodiments, the dithering controller 350 may control the dithering circuit 320 and the signal selector 330 to activate the dithering and output the dithered image data DDAT as the second image data DAT' only when the first image data DAT corresponds to predetermined frame frequencies, for example, 120 Hz, 144 Hz, 175 Hz, and 240 Hz.

Figure 9:
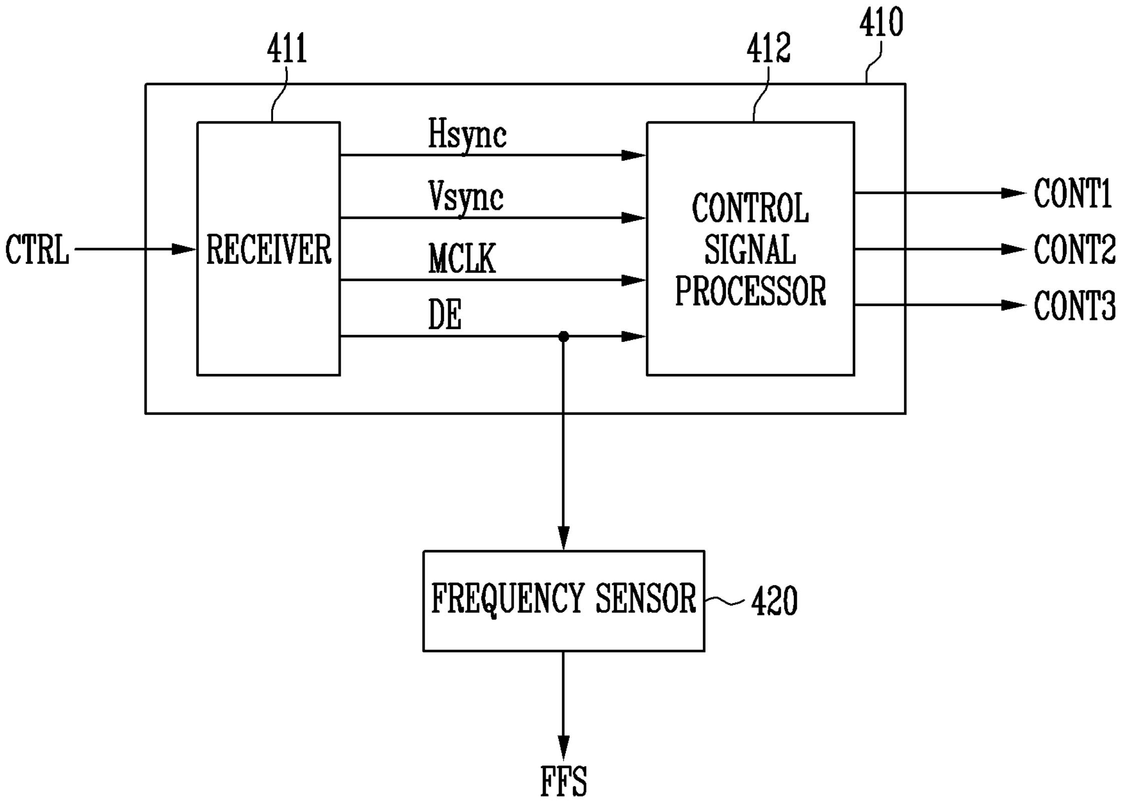
FIG. 9 is a block diagram illustrating an embodiment of a control signal processor of FIG. 3 and a frequency sensor connected thereto.

FIG. 9 is a block diagram illustrating an embodiment of the control signal processor of FIG. 3 and the frequency sensor connected thereto. FIG. is a timing diagram illustrating an embodiment of the data enable signal of FIG. 9.

Referring to FIGS. 3 and 9, an embodiment of the control signal processor 410 may include a receiver 411 and a control signal processor 412.

The receiver 411 receives a control signal CTRL, and restore a horizontal synchronization signal Hsync, a vertical synchronization signal Vsync, a main clock signal MCLK, and a data enable signal DE from the control signal CTRL. The control signal processor 412 may generate the first to third control signals CON1 to CON3 based on the horizontal synchronization signal Hsync, the vertical synchronization signal Vsync, the main clock signal MCLK, and the data enable signal DE. The generated first to third control signals CONT1 to CONT3 are transmitted to the data driver 150 (refer to FIG. 1), the gate driver 140 (refer to FIG. 1), and the voltage generator 130 (refer to FIG. 1), respectively.

Figure 10:
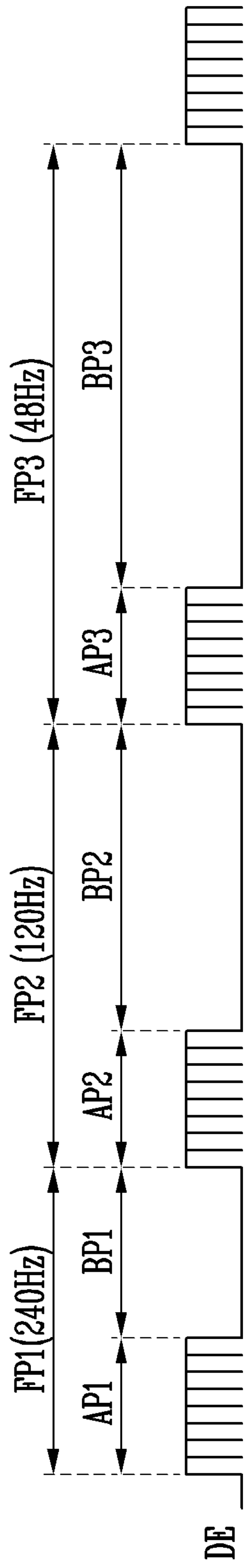
FIG. 10 is a timing diagram illustrating an embodiment of a data enable signal of FIG. 9.

The frequency sensor 420 may sense the frame frequency corresponding to the first image data DAT based on the control signal CTRL. In embodiments, the frequency sensor 420 may receive the data enable signal DE and sense the frame frequency corresponding to the first image data DAT based on the data enable signal DE. Referring to FIG. 10, the data enable signal DE may have an active period and a blank period in each of the first to third frame periods FP1 to FP3 similarly to the first image data DAT of FIG. 7. The data enable signal DE is enabled in first to third active periods AP1 to AP3 and is disabled in first to third blank periods BP1 to BO3. While the data enable signal DE is enabled, the image frames VF1 to VF4 of the first image data DAT of FIG. 7 may be received. The first to third active periods AP1 to AP3 have a same time duration as each other, while the first to third blank periods BP1 to BP3 have different time durations from each other. As described above, the data enable signal DE may have a variable blank period in each frame period. The frequency sensor 420 may determine each of the frame frequencies of the first to third frame periods FP1 to FP3 by sensing the variable blank period. In an embodiment, for example, the frequency sensor 420 may sense the blank period by counting the number of times a clock signal is toggled during the blank period. The sensed frame frequency may be provided as the frame frequency signal FFS of FIG. 4.

In addition, the frame frequency corresponding to the first image data DAT may be determined based on various methods. In embodiments, the vertical synchronization signal Vsync may be a signal that is toggled once for each frame period, and the frequency sensor 420 may determine the frame frequency corresponding to the first image data DAT by sensing the vertical synchronization signal Vsync.

Figure 11:
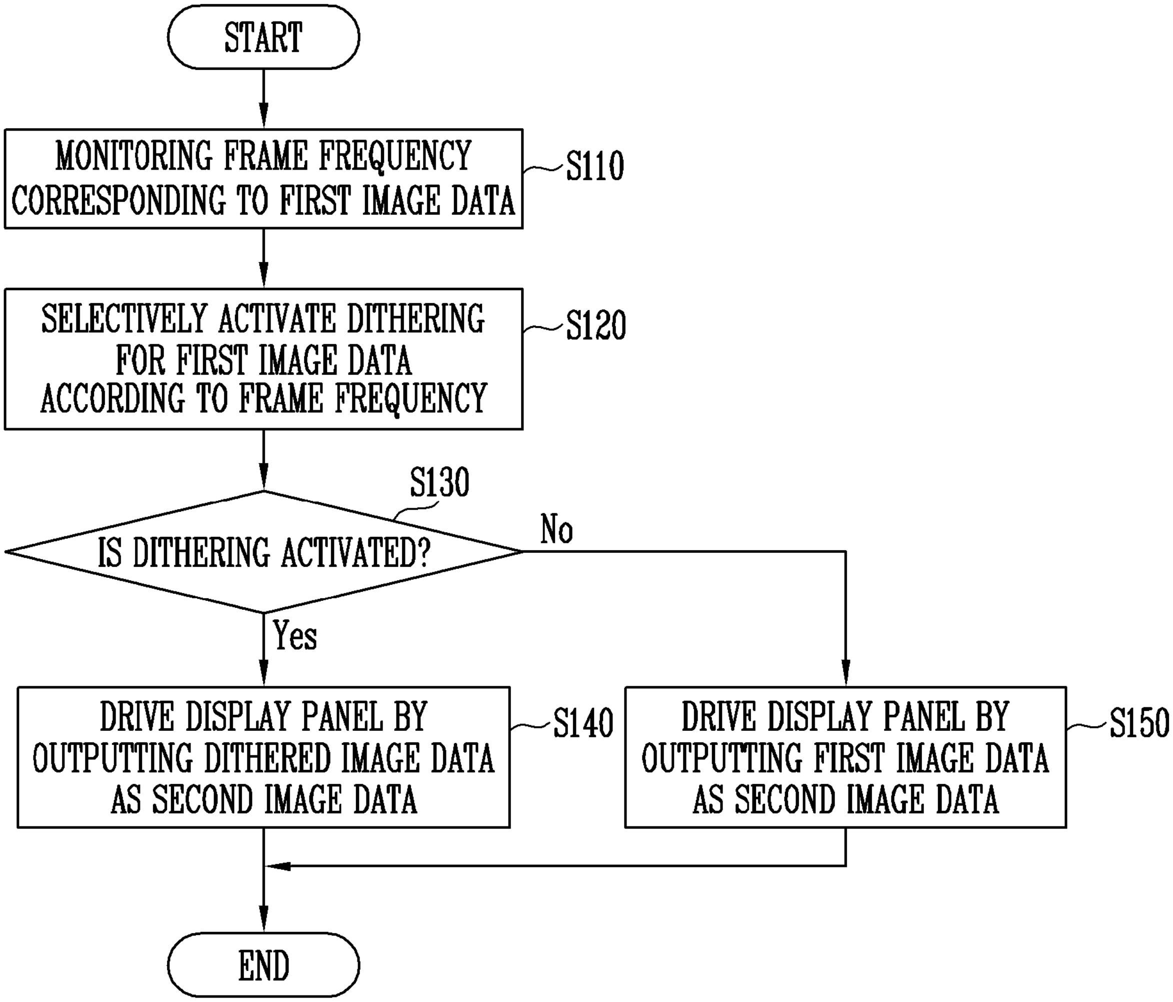
FIG. 11 is a flowchart illustrating a method of driving a display panel by processing image data input at a variable refresh rate according to an embodiment of the disclosure.
Figure 12A:
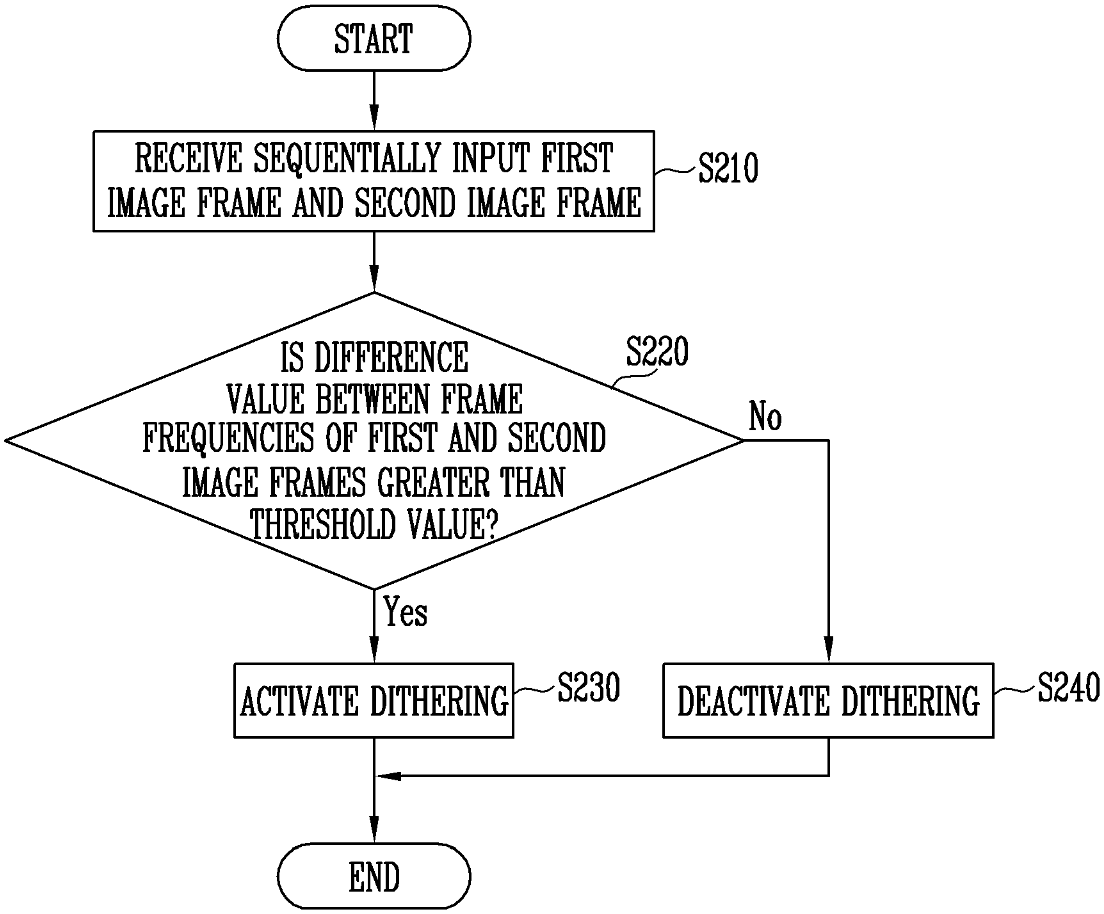
FIG. 12A is a flowchart illustrating an embodiment of operation S120 of FIG. 11.

FIG. 11 is a flowchart illustrating a method of driving a display panel by processing image data input at a variable refresh rate according to an embodiment of the disclosure. FIG. 12A is a flowchart illustrating an embodiment of operation S120 of FIG. 11.

Referring to FIGS. 1 and 11, in operation S110, the display device 100 monitors the frame frequency corresponding to the first image data DAT.

In operation S120, the display device 100 selectively activates the dithering on the first image data DAT based on the frame frequency. The display device 100 may activate the dithering when the frame frequency is rapidly decreased. Referring to FIGS. 1 and 12A, in operation S210, the sequentially input first and second image frames are received as the stream of first image data DAT. In operation S220, operation S230 or operation S240 may be performed based on o whether a difference between frame frequencies of the first and second image frames is greater than a threshold value. When the frame frequency of the second image frame is lower than the frame frequency of the first image frame and the difference between the frame frequencies of the first and second image frames is greater than the threshold value, the dithering may be activated in operation S230, and deactivation of the dithering is maintained in operation S240.

Referring to FIGS. 1 and 11, in operation S130, operation S140 or operation S150 is performed based on whether the dithering is activated.

In operation S140, the display device 100 may drive the display panel 110 by outputting the dithered image data as the second image data DAT' to the data driver 150. Accordingly, the display panel 110 may display an image corresponding to the dithered image data.

In operation S150, the display device 100 outputs the first image data DAT as the second image data DAT' to the data driver 150. Accordingly, the display panel 110 may display an image corresponding to the first image data DAT.

As described above, the dithering may be selectively activated based on the frame frequency of the first image data DAT, and the display panel 110 may be driven based on the dithered image data. Accordingly, even though the frame frequency of the first image data DAT rapidly changes, the luminance change of the display image may be suppressed. Therefore, an image may be displayed with improved reliability.

Figure 12B:
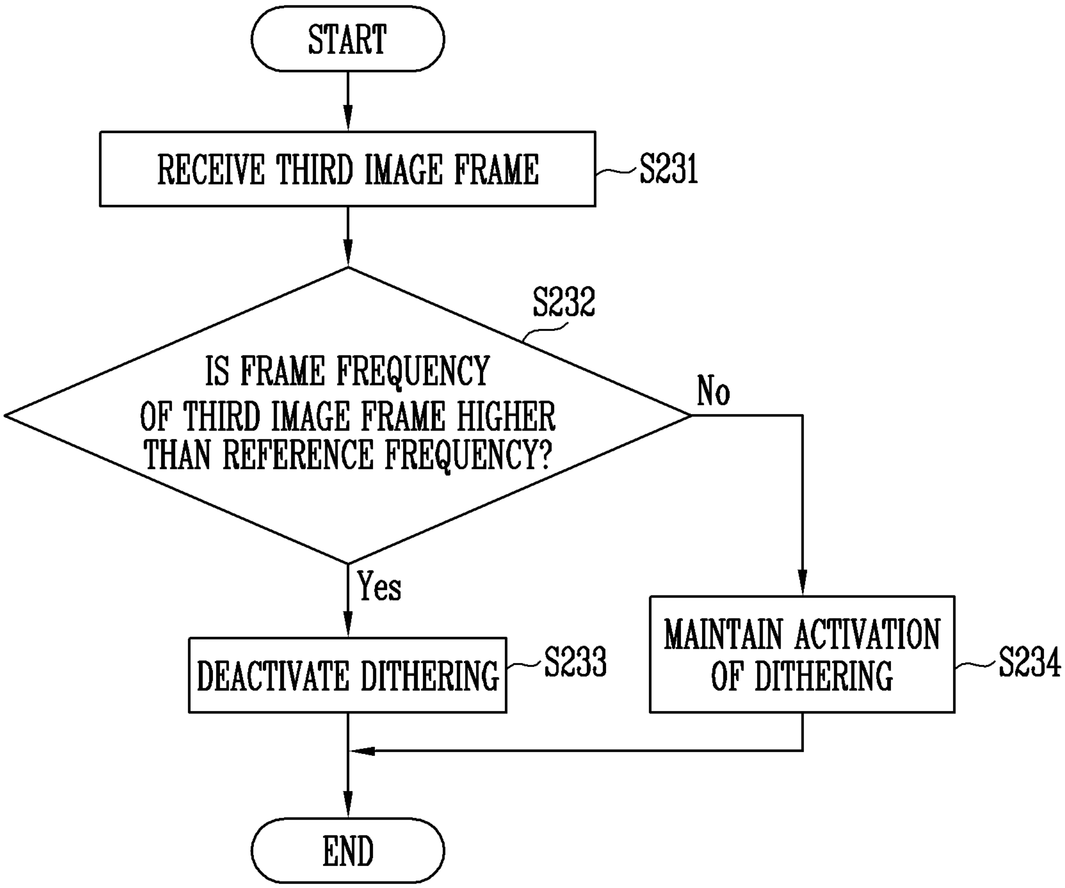
FIG. 12B is a flowchart illustrating an embodiment of a method of deactivating the dithering again after the dithering is activated at operation S230 of FIG. 12A.

FIG. 12B is a flowchart illustrating an embodiment of a method of deactivating the dithering after the dithering is activated at operation S230 of FIG. 12A.

After the dithering is activated as in operation S230 of FIG. 12A, the display device 100 may deactivate the dithering again in response to an increase of the frame frequency. Referring to FIGS. 1 and 12B, in operation S231, the third image frame is received. The third image frame is input after reception of the second image frame. In operation S232, it is determined whether the frame frequency of the third image frame is higher than the reference frequency. The reference frequency may be experimentally selected according to embodiments. In an embodiment, for example, the reference frequency may be a value obtained by adding half of a maximum frequency to the third frequency F3 of FIG. 8B. In an embodiment, for example, the reference frequency may be 180 Hz. When the frame frequency of the third image frame is higher than the reference frequency, operation S233 is performed. When the frame frequency of the third image frame is not higher than the reference frequency, operation S234 is performed. The dithering is deactivated in operation S233, and activation of the dithering is maintained in operation S234. As described above, the display device 100 may deactivate the dithering again by referring to the frame frequency of each of the image frames received after the dithering is activated.

Figure 13:
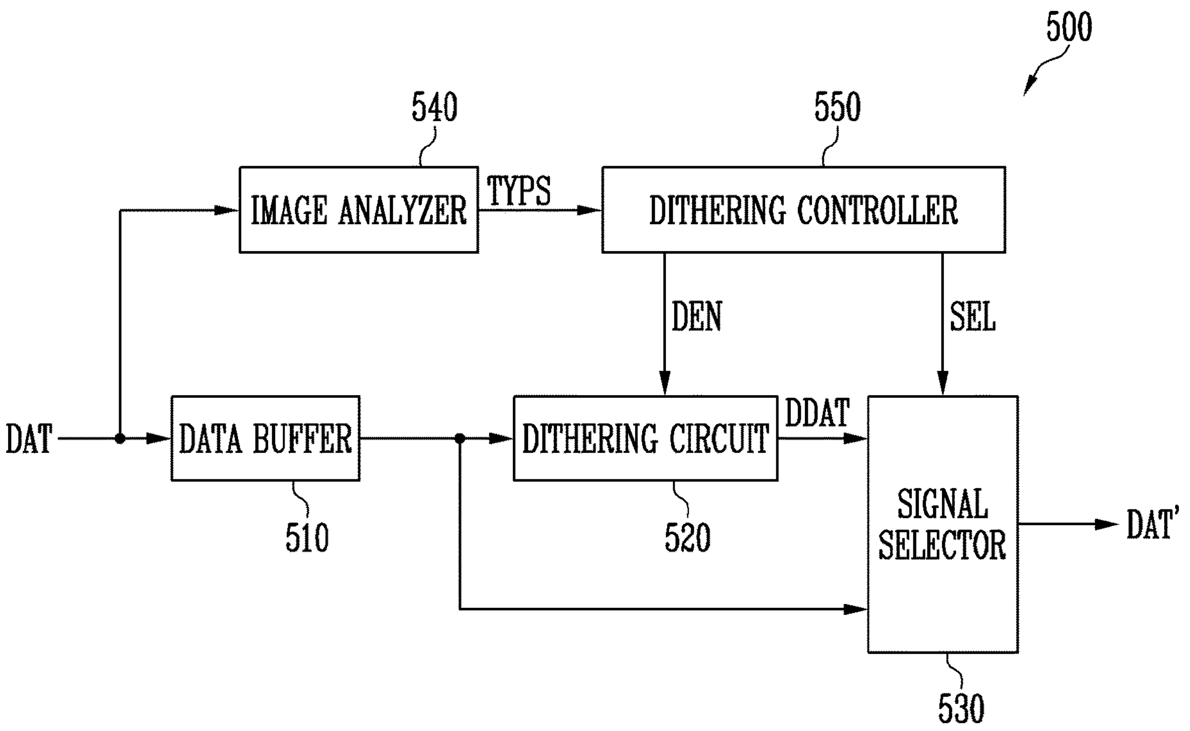
FIG. 13 is a block diagram illustrating another embodiment of the image signal processor of FIG. 3.

FIG. 13 is a block diagram illustrating another embodiment of the image signal processor of FIG. 3.

Referring to FIG. 13, an embodiment of the image signal processor 500 may include a data buffer 510, a dithering circuit 520, a signal selector 530, an image analyzer 540, and a dithering controller 550.

The data buffer 510, the dithering circuit 520, and the signal selector 530 are substantially the same as the data buffer 310, the dithering circuit 320, and the signal selector 330 described above FIG. 4, respectively, and any repetitive detailed description thereof will hereinafter be omitted.

In an embodiment, the image analyzer 540 may determine an image type corresponding to the first image data DAT and generate an image type signal TYPS indicating the determined image type. The image type signal TYPS may include information related to a type of a content included in the first image data DAT. In an embodiment, for example, the image type signal TYPS may indicate whether the first image data DAT corresponds to a document content or not. When the first image data DAT does not correspond to the document content, the first image data DAT may correspond to, for example, a multimedia (or video) content. The image analyzer 540 will be described in greater detail with reference to FIG. 14.

In response to the image type signal TYPS, the dithering controller 550 may control the dithering circuit 520 and the signal selector 530. When the first image data DAT corresponds to the document content, an area of data pixels having substantially similar grayscale values may be relatively wide, and in this case, the dither pattern (refer to FIG. 5) may be recognized in a corresponding area of the display image. When the first image data DAT corresponds to the document content based on the image type signal TYPS, the dithering controller 550 may deactivate the dithering circuit 520 and control the signal selector 530 to output the first image data DAT as the second image data DAT'. When the first image data DAT does not correspond to the document content based on the image type signal TYPS, the dithering controller 550 may activate the dithering circuit 520 and control the signal selector 530 to output the dithered image data DDAT as the second image data DAT'.

Figure 14:
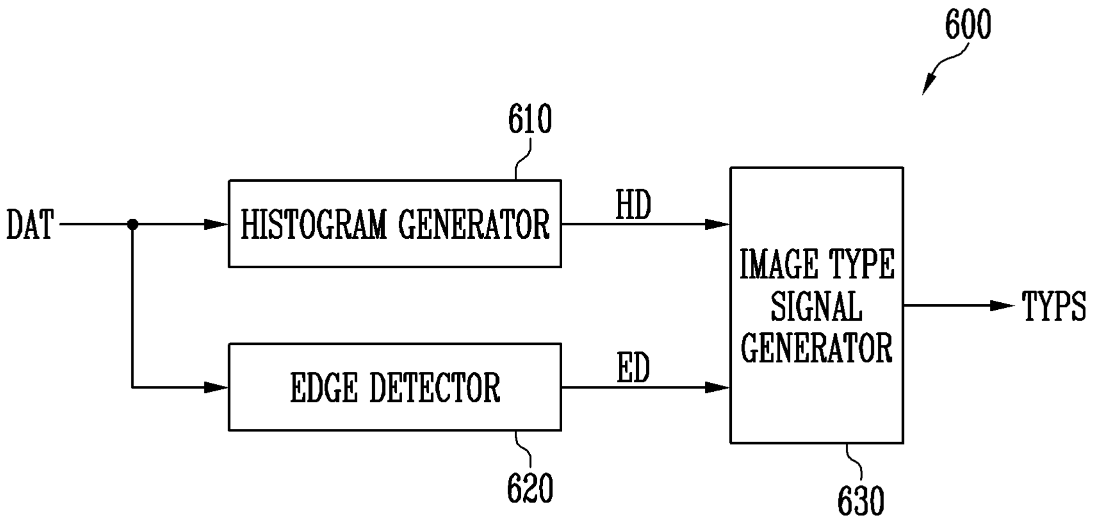
FIG. 14 is a block diagram illustrating an embodiment of an image analyzer of FIG. 13.
Figure 15:
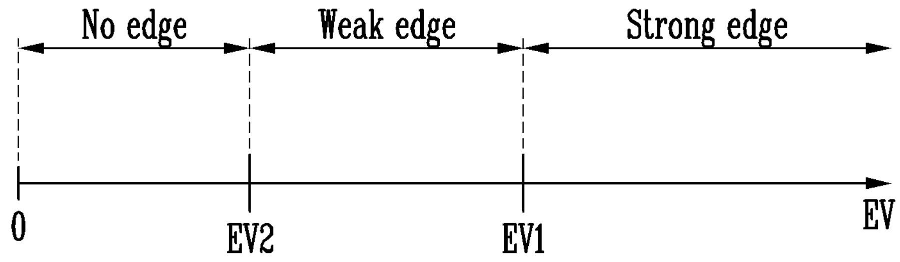
FIG. 15 is a diagram conceptually illustrating comparison values for detecting data pixels corresponding to an edge among data pixels of the image data.

FIG. 14 is a block diagram illustrating an embodiment of the image analyzer of FIG. 13. FIG. 15 is a diagram conceptually illustrating comparison values for detecting data pixels corresponding to an edge among the data pixels of the image data.

Referring to FIG. 14, an embodiment of the image analyzer 600 may include a histogram generator 610, an edge detector 620, and an image type signal generator 630.

The histogram generator 610 may generate a histogram for grayscales of the data pixels of the first image data DAT, and provide data HD (hereinafter, histogram data) associated with the generated histogram to the image type signal generator 630. The histogram generator 610 may generate a histogram based on one of various methods known in the art. In an embodiment, for example, the histogram generator 610 may generate the histogram from the first image data DAT by employing a Shannon entropy algorithm.

The edge detector 620 may detect an edge rate of the first image data DAT and provide data ED (hereinafter, edge data) indicating the edge rate to the image type signal generator 630.

The edge detector 620 may provide the edge data ED by detecting the edge rate based one of various methods known in the art. In embodiments, the edge detector 620 may determine the edge rate of the first image data DAT by employing a Robert cross edge detection algorithm. In an embodiment, for example, the edge detector 620 may calculate an edge value of a corresponding data pixel based on a difference between a grayscale of each data pixel and a grayscale of a data pixel adjacent thereto. When the edge value of the data pixel is greater than or equal to a first edge value EV1 of FIG. the corresponding data pixel may correspond to a strong edge. When the edge value of the data pixel is greater than or equal to a second edge value EV2 of FIG. 15 and less than the first edge value EV1 of FIG. 15, the corresponding data pixel may correspond to a weak edge. When the edge value of the data pixel is lower than the second edge value EV2 of FIG. 15, the corresponding data pixel does not correspond to the edge. The edge detector 620 may determine the edge rate of the first image data DAT based on the number of data pixels corresponding to the strong edge. In an embodiment, for example, a value obtained by dividing the number of data pixels corresponding to the weak edge from the number of data pixels corresponding to the strong edge may be determined as the edge rate.

The image type signal generator 630 may generate the image type signal TYPS indicating the image type corresponding to the first image data DAT based on the histogram data HD and the edge data ED.

When the number of data pixels belonging to a specific grayscale range in the histogram data HD is higher than a first reference value, the image type signal generator 630 may determine the first image data DAT as the document content. When the edge rate corresponding to the edge data ED is higher than a second reference value, the image type signal generator 630 may determine the first image data DAT as the document content. When the number of data pixels belonging to the specific grayscale range in the histogram data HD is lower than or equal to the first reference value, and the edge rate corresponding to the edge data ED is lower than or equal to the second reference value, the image type signal generator 630 may determine that the first image data DAT does not correspond to the document content.

According to an embodiment of the disclosure, the dithering of the first image data DAT may be selectively activated based on the image type of the first image data DAT to display the image. Accordingly, the dither pattern may be effectively prevented from being recognized in the display image. In an embodiment, for example, when the first image data DAT corresponds to the document content, the dither pattern may not be recognized in the display image.

Figure 16:
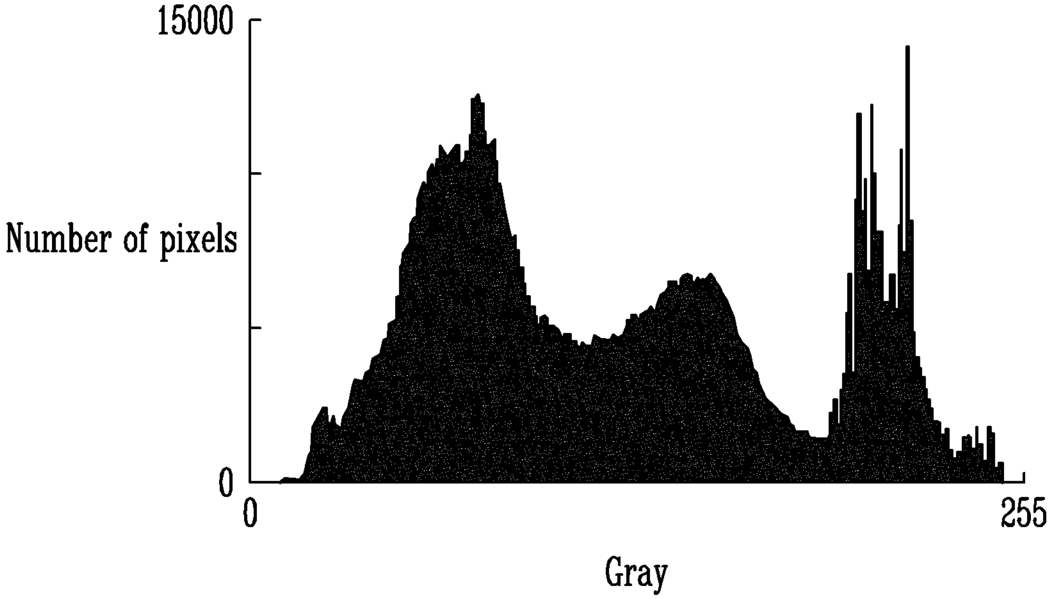
FIG. 16 is a graph illustrating an example of a histogram for data pixels when an image type of first image data DAT is not a document content.
Figure 17:
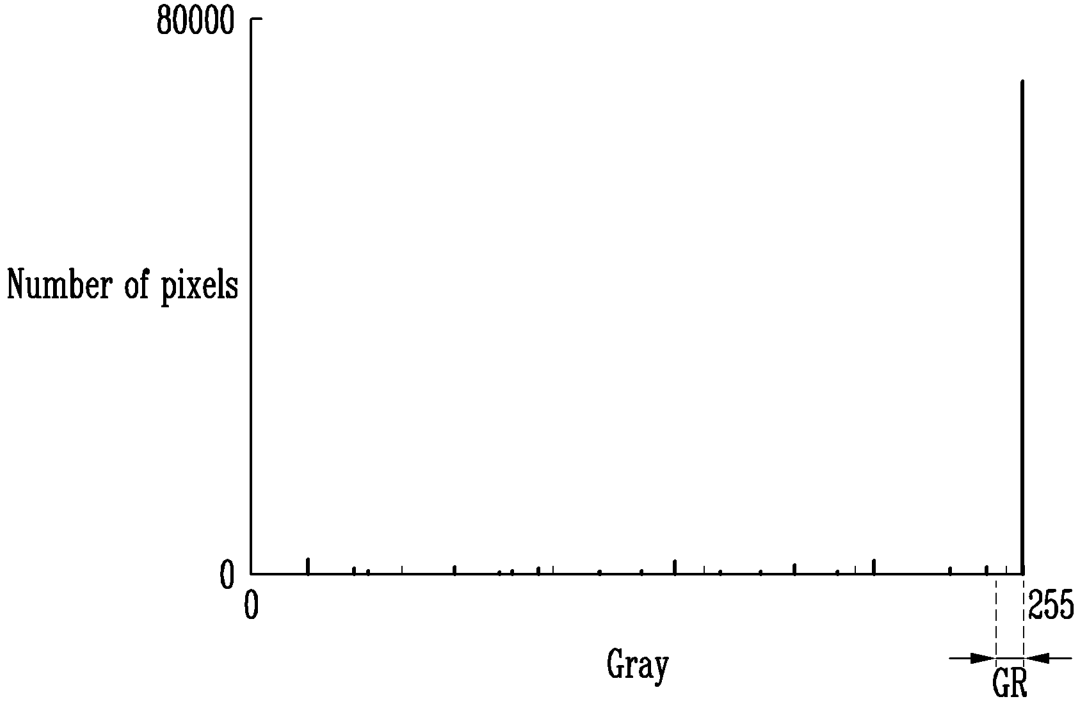
FIG. 17 is a graph illustrating an example of the histogram of the data pixels when the image type of the first image data DAT is the document content.

FIG. 16 is a graph illustrating an example of the histogram for the data pixels when the image type of the first image data DAT is not the document content. FIG. 17 is a graph illustrating an example of the histogram of the data pixels when the image type of the first image data DAT is the document content.

First, referring to FIG. 16, in the histogram, the data pixels of the first image data DAT are distributed over various grayscales. On the other hand, referring to FIG. 17, in the histogram, the data pixels of the first image data DAT are relatively biased and distributed in a specific grayscale range GR. This is caused by a fact that the document content is mainly configured of a text and includes data pixels relatively biased to specific grayscales.

When the number of data pixels belonging to the specific grayscale range GR in the histogram is higher than the first reference value, the image type signal generator 630 of FIG. 14 may determine the first image data DAT as the document content. The first reference value may be experimentally determined according to an embodiment.

Figure 18:
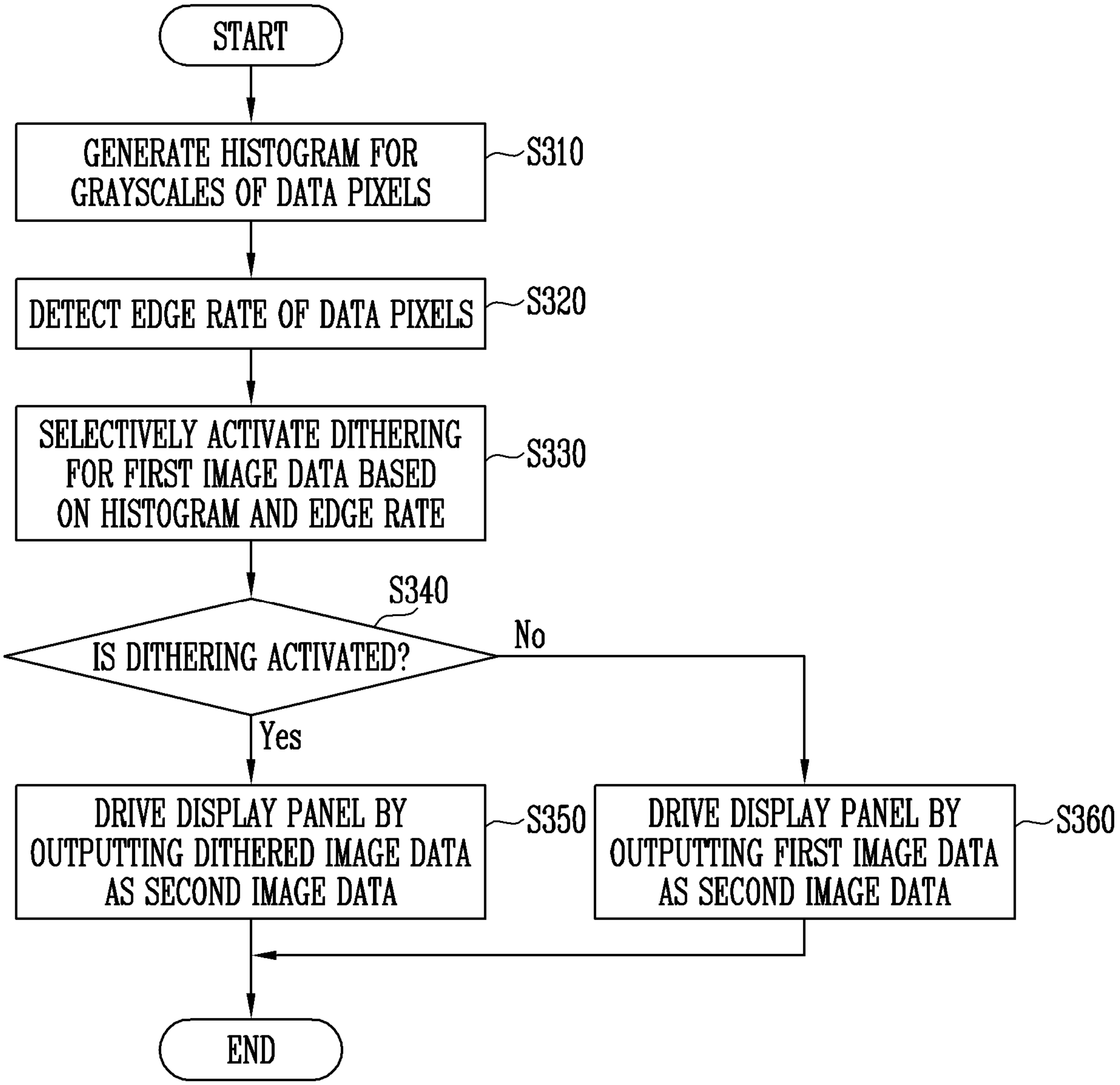
FIG. 18 is a flowchart illustrating a method of driving a display panel by processing image data based on an image type according to an embodiment of the disclosure.
Figure 19:
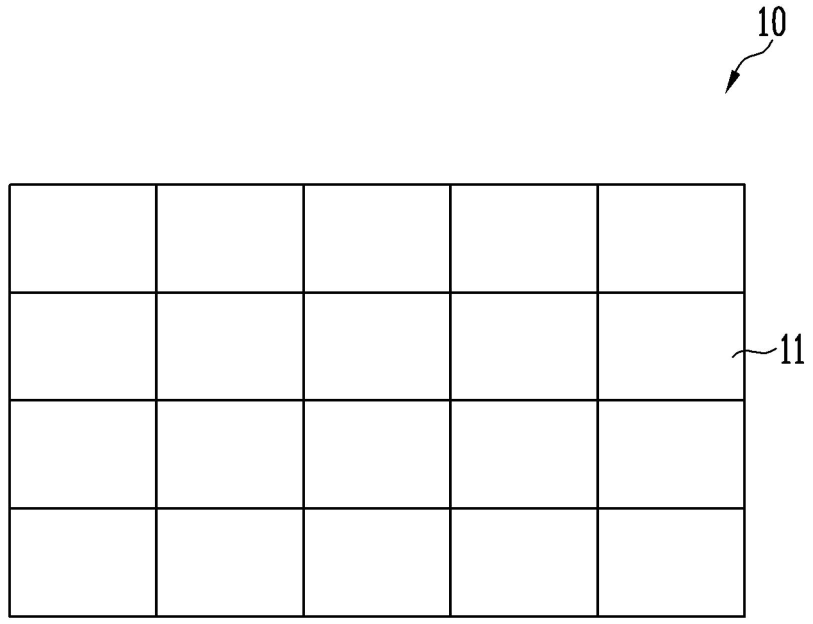
FIG. 19 is a diagram conceptually illustrating an image frame divided into a plurality of blocks.

FIG. 18 is a flowchart illustrating a method of driving a display panel by processing image data based on an image type according to an embodiment of the disclosure. FIG. 19 is a diagram conceptually illustrating an image frame divided into a plurality of blocks.

Referring to FIGS. 1 and 18, in operation S310, the display device 100 generates the histogram for the grayscales of the data pixels. In operation S320, the display device 100 detects the edge rate of the data pixels.

In embodiments, operations S310 and S320 may be performed in a unit of each image frame of the first image data DAT. In such embodiments, in operation S310, the histogram for the data pixels of the image frame of the first image data DAT is generated, and in operation S320, the edge rate for the data pixels of the corresponding image frame is detected.

In operation S330, the display device 100 selectively activates the dithering of the first image data DAT based on the histogram and the edge rate.

When the number of data pixels belonging to the specific grayscale range in the histogram is higher than the first reference value, the first image data DAT may correspond to the document content. In this case, the dithering may be deactivated. When the detected edge rate is higher than the second reference value, the first image data DAT may correspond to the document content. In this case, the dithering may be similarly deactivated. When the number of data pixels belonging to the specific gradation range is lower than or equal to the first reference value and the detected edge rate is lower than or equal to the second reference value, the first image data DAT may not correspond to the document content and may correspond to, for example, a multimedia content. In this case, the dithering may be activated.

In embodiments, operations S310 and S320 may be performed in a unit of a block included in the image frame. Referring to FIG. 19, an image frame 10 may be divided into a plurality of blocks 11. In operation S310, a histogram for data pixels of each of the plurality of blocks 11 is generated. In operation S320, an edge rate of each of the data pixels of the plurality of blocks 11 is detected. In operation S330, the dithering of the first image data DAT may be selectively activated based on a histogram and an edge rate of at least a portion of the plurality of blocks 11. A corresponding block may be determined as the document content based on the number of data pixels belonging to the specific grayscale range in the histogram. Based on the edge rate, the corresponding block may be determined as the document content. When a ratio of blocks corresponding to the document content among the plurality of blocks 11 is higher than a reference ratio, the dithering for the first image data DAT may be deactivated.

In embodiments, when the first image data DAT has a resolution different from that of the display panel 110, the plurality of blocks 11 may include only data pixels of substantially the same grayscale values on the histogram and may include a dummy block having an edge rate of 0. Blocks other than the dummy blocks are selected among the plurality of blocks 11, and operation S330 may be performed based on the histogram and the edge rate of the selected blocks.

Operations S340, S350, and S360 are described similarly to operations S130, S140, and S150 of FIG. 11, and repetitive detailed description thereof will be omitted.

According to an embodiment of the disclosure, the dithering may be selectively activated based on the image type of the first image data DAT to display the image. Accordingly, the dither pattern may be effectively prevented from being recognized in the display image.

Figure 20:
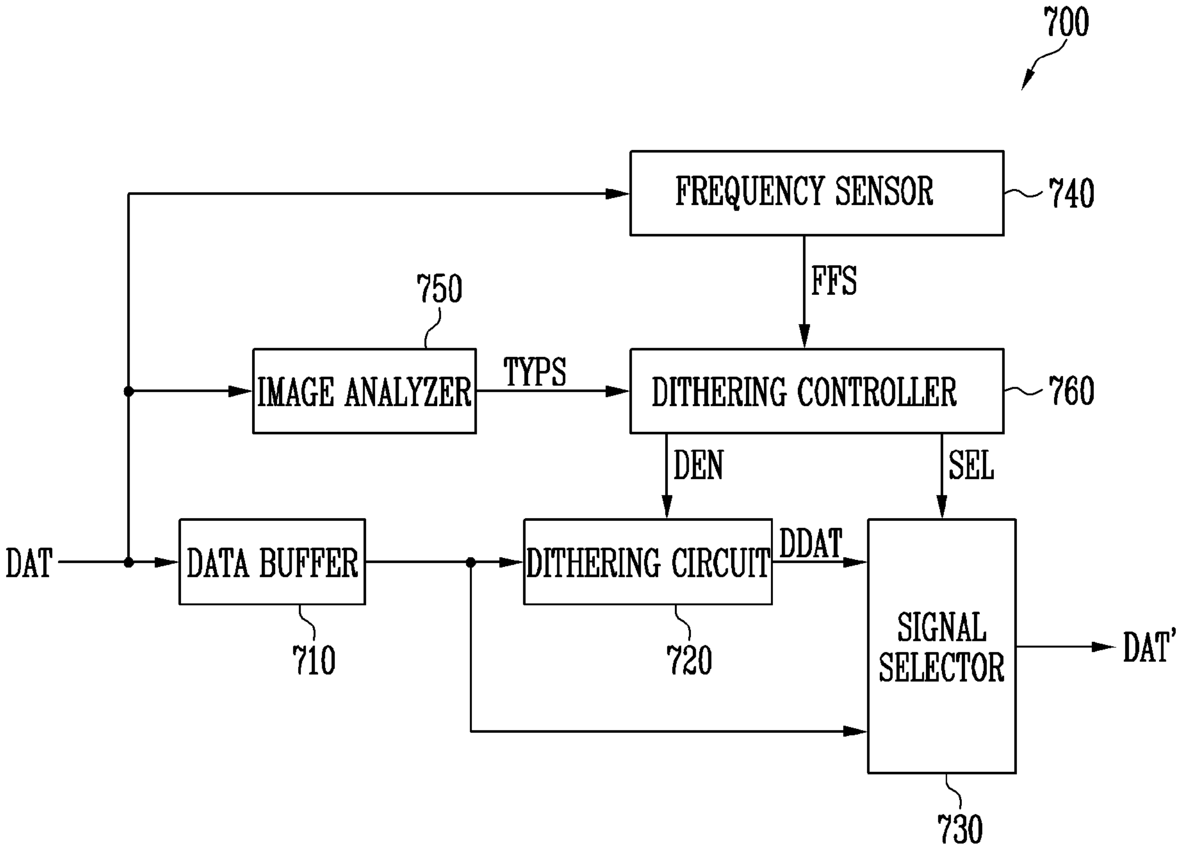
FIG. 20 is a block diagram illustrating still another embodiment of the image signal processor of FIG. 4.

FIG. 20 is a block diagram illustrating still another embodiment of the image signal processor of FIG. 4.

Referring to FIG. 20, an embodiment of the image signal processor 700 may include a data buffer 710, a dithering circuit 720, a signal selector 730, a frequency sensor 740, an image analyzer 750, and a dithering controller 760.

In such an embodiment, the data buffer 710, the dithering circuit 720, the signal selector 730, and the frequency sensor 740 are substantially the same as the data buffer 310, the dithering circuit 320, the signal selector 330, and the frequency sensor 340 described above with reference to FIG. 4, respectively, and any repetitive detailed description thereof will hereinafter be omitted.

In such an embodiment, the image analyzer 750 is substantially the same as the image analyzer 540 described with reference to FIG. 13 and any repetitive detailed description thereof will hereinafter be omitted.

In such an embodiment, the dithering controller 760 may control the dithering circuit 720 and the signal selector 730 based on the frame frequency signal FFS from the frequency sensor 740 and the image type signal TYPS from the image analyzer 750.

In embodiments, when the first image data DAT is the document content based on the image type signal TYPS, the dithering controller 760 may deactivate the dithering circuit 720 and control the signal selector 730 to output the first image data DAT as the second image data DAT'. When the first image data DAT is not the document content based on the image type signal TYPS, the dithering controller 760 may control the dithering circuit 720 and the signal selector 730 based on the frame frequency signal FFS similarly to the dithering controller 350 described with reference to FIG. 4.

Figure 21:
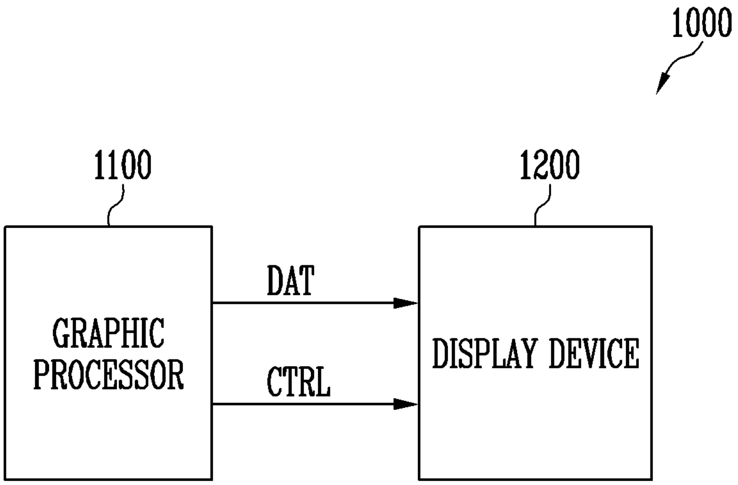
FIG. 21 is a block diagram illustrating an embodiment of an image display system.

FIG. 21 is a block diagram illustrating an embodiment of an image display system.

Referring to FIG. 21, the image display system 1000 includes a graphic processor 1100 and a display device 1200. The graphic processor 1100 provides the first image data DAT and the control signals CTRL to the display device 1200.

A driving frequency of the display device 1200 may vary according to a rendering speed of the graphic processor 1100. The display device 1200 may include the display device 100 shown in FIG. 1.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of pixels;

a data driver connected to the plurality of pixels through data lines, wherein the data driver controls the plurality of pixels by driving the data lines; and a controller which controls a driving of the data driver by processing image data input thereto at a variable refresh rate, wherein the controller performs or does not perform dithering on input image data, which is input thereto, based on a frame frequency corresponding to the input image data and controls the driving of the data driver based on one of dithered image data and the input image data, on which no dithering is performed, wherein when the controller performs the dithering on the input image data, the controller outputs the dithered image data to the data driver, when the controller does not perform the dithering on the input image data, the controller outputs the input image data, on which no dithering is performed, to the data driver, wherein the input image data includes a first image frame and a second image frame which are consecutive, the first image frame corresponds to a first frame frequency, the second image frame corresponds to a second frame frequency, and the controller triggers performance of the dithering when the difference value between the first and second frame frequencies is greater than a threshold value.

2. The display device according to claim 1, wherein the input image data further includes a third image frame input after the second image frame, the third image frame corresponds to a third frame frequency higher than the second frame frequency, and the controller deactivates the performance of the dithering when the third frame frequency is higher than a predetermined reference frequency.

3. The display device according to claim 1, wherein the frame frequency changes between a fourth frequency and a fifth frequency higher than the fourth frequency, the controller controls the driving of the data driver by selectively performing the dithering based on a change value of the frame frequency when the frame frequency is higher than a sixth frequency and lower than the fifth frequency, and the sixth frequency is in a range between the fourth and fifth frequencies.

4. The display device according to claim 1, wherein the controller comprises:

a dithering circuit which performs the dithering on the input image data; and a signal selector which outputs the one of the dithered image data and the input image data.

5. The display device according to claim 4, wherein the controller further comprises a dithering controller which activates or deactivates the dithering circuit based on a change value of the frame frequency.

6. The display device according to claim 5, wherein the controller comprises a frequency sensor which generates a signal indicating the frame frequency based on at least one selected from the input image data and a control signal associated with the input image data, and provides the signal to the dithering controller.

7. The display device according to claim 5, wherein the dithering controller generates a selection signal which is enabled when the dithering circuit is activated and disabled when the dithering circuit is deactivated, and the signal selector selects and outputs one of the dithered image data and the input image data in response to the selection signal.

8. The display device according to claim 1, wherein the controller comprises a timing controller which receives the input image data from an external graphic processor.

9. An image display system comprising:

a graphic processor which provides input image data at a variable refresh rate; and a display device which receives the input image data, wherein the display device comprising:

a display panel including a plurality of pixels;

a data driver connected to the plurality of pixels through data lines, wherein the data driver controls the plurality of pixels by driving the data lines; and a controller which controls a driving of the data driver by processing the input image data, wherein the controller performs or does not perform dithering on the input image data based on a frame frequency corresponding to the input image data, and controls the driving of the data driver based on one of dithered image data and the input image data, on which no dithering is performed, wherein when the controller performs the dithering on the input image data, the controller outputs the dithered image data to the data driver, when the controller does not perform the dithering on the input image data, the controller outputs the input image data, on which no dithering is performed, to the data driver;

wherein the input image data includes a first image frame and a second image frame which are consecutive, the first image frame corresponds to a first frame frequency, the second image frame corresponds to a second frame frequency, and the controller triggers performance of the dithering when the difference value between the first and second frame frequencies is greater than a threshold value.

* * * * *